Figure 1:
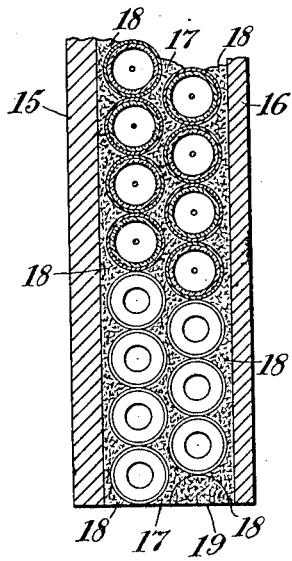

C. J. COLEMAN.
HEAT INSULATING WALL.
APPLICATION FILED MAR. 23, 1908.

984,541.

Patented Feb. 21, 1911.

Witnesses:

Inventor:
Clyde J. Coleman
by Henry D. Williams
Attorney.

UNITED STATES PATENT OFFICE.

CLYDE J. COLEMAN, OF NEW YORK, N. Y.

HEAT-INSULATING WALL.

984,541.  Specification of Letters Patent. Patented Feb. 21, 1911.

Application filed March 23, 1908. Serial No. 422,816.

*To all whom it may concern:*

Be it known that I, CLYDE J. COLEMAN, a citizen of the United States, residing in the borough of Manhattan, city of New York, in the county of New York and State of New York, have invented a certain new and useful Improvement in Heat-Insulating Walls, of which the following is a specification, reference being had therein to the accompanying drawings, forming part thereof.

My invention relates generally to heat insulation and relates particularly to heat insulating walls such as of cold storage buildings, household refrigerators and compartments, and of refrigerator cars.

The objects of my invention are to secure a high degree of heat insulation together with a simple and inexpensive construction; and also to secure flexibility of the heat insulating walls.

My invention also has other objects and advantages which will appear from the following description.

My present invention is related in a general way to my former invention which is the subject of my application for Letters Patent Serial No. 397,071, filed October 12, 1907, for heat insulation, and this present invention is also generally related to two other of my inventions for which applications for Letters Patent are executed on even date herewith and are filed in the Patent Office contemporaneously herewith, under Serial Numbers 422,815 and 422,817, respectively. My said inventions all employ vacuum inclosing bodies or a plurality of units each inclosing a vacuum as a part of the heat insulating construction. The high efficiency of a vacuum as a heat insulator has been long known, but prior to my said inventions no practical embodiment of the same has been made in heat insulating walls of any considerable size, such as required in the examples above noted.

My present invention is directed to producing a highly effective heat insulating wall of any desired size and having the desired flexibility, and includes vacuum spaces in its construction as a principal part of the heat insulation.

To these ends my invention includes cylindrical vacuum inclosing bodies or vacuum units one abutting another longitudinally and assembled in the heat insulating wall substantially parallel with the plane thereof.

My invention also includes vacuum inclosing heat insulating units of circular cross section each provided at one end with a projecting sealing tip and at the other end with an indentation or depression so that when the units are assembled in longitudinal juxtaposition the sealing tip of one unit will enter the recess or depression in the next adjacent unit, thus permitting compact arrangement.

My invention also includes arranging the circular elongated vacuum units in layers in substantial parallelism with the plane of the wall and interposing low heat conductive material between the layers and filling the interstices.

My invention also includes several details of construction and other advantageous features which will hereinafter appear.

I will now describe my invention with reference to the accompanying drawings and will thereafter point out my invention in claims.

Figure 2:
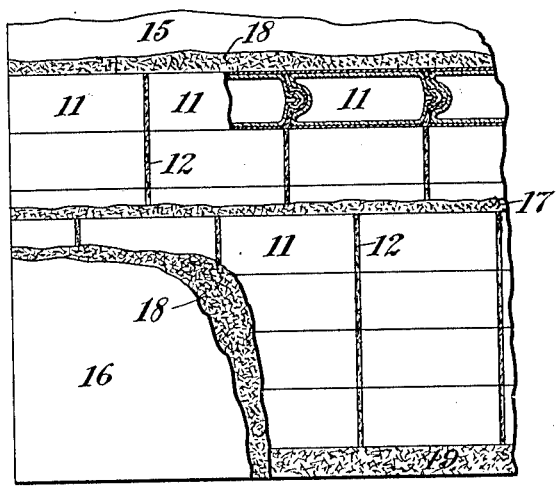
Figure 3:
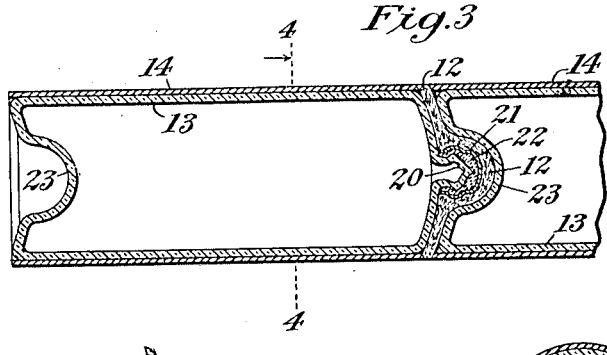
Figure 6:
Figure 5:
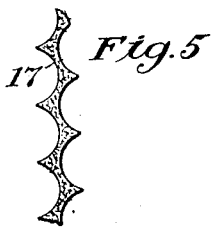
Figure 4:
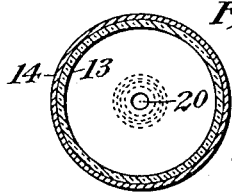

Figure 1 is a transverse vertical section of a heat insulating wall embodying my invention. Fig. 2 is an elevation of the heat insulating wall shown in Fig. 1 with portions broken away. Fig. 3 is an enlarged detail view showing one of the vacuum inclosing bodies and a portion of another such body, in central longitudinal section and abutted together or joined in the positions that the vacuum inclosing bodies occupy in the heat insulating walls of Figs. 1 and 2. Fig. 4 is an enlarged transverse section of a vacuum inclosing unit taken on the line 4—4 of Fig. 3 looking toward the right. Fig. 5 is a detail vertical section of a portion of a low heat conductive filling plate or spacing sheet interposed between the adjacent layers of vacuum inclosing units. Fig. 6 is a similar view of a filling plate adapted to be interposed between the outside layers of vacuum inclosing units and a suitable support.

In the embodiment of my invention illustrated in the drawings cylindrical vacuum inclosing bodies or vacuum inclosing cylinders 11 are provided and are arranged in the wall structure abutting one another in longitudinal alinement, the longitudinally alined bodies forming continuous cylindrical rods as indicated in the drawings. Cushioning pads 12 are interposed between the adjacent or juxtaposed ends of the bodies 11 to cushion these bodies from each other longitudinally. The cylindrical rods, composed of the cylindrical vacuum inclosing bodies 11 and the interposed pads or cushioning disks 12, are arranged side by side in contact one with another to form a layer extending substantially parallel with the plane of the wall. The vacuum inclosing cylinders 11 include in their construction a pressure-resisting shell 13 and a cushioning sleeve 14 (see Figs. 3 and 4 especially) circumferentially surrounding the shell 13 and adherently secured thereto. The cushioning sleeve 14 cushions the vacuum inclosing units 11 from each other transversely when such units or bodies are arranged in contact one with another to form a layer, as above described.

A plurality of layers of vacuum inclosing units are provided extending substantially parallel with the plane of the wall and the layers are slightly spaced one from another, as best seen in Fig. 1, two such layers being shown in the heat insulating wall illustrated in the drawings. The cylindrical rods of the adjacent layers are arranged so that the rods of one layer break joints with the rods of the other layer (Fig. 1). Supports 15 and 16 are provided for the layers at the outside thereof and slightly spaced therefrom and fillers of low heat conductive material are provided for the space between the layers and for the spaces between the outer sides of the layers and the supports 15 and 16. The support 15 forms the outer part of the wall and may be the siding of a building or other inclosure, and the support 16 forms the inner part of the wall and may be the ceiling or inner facing of the wall. The low heat conductive filling between the layers is shown as a sheet or plate 17 provided on opposite sides with grooves offset from each other and having angular projecting ridges between the grooves. The grooves in the sheet 17 conform to the rounded contour of the vacuum inclosing cylinders 11 which compose the cylindrical rods, and the ridges fit into the angles between the rods and fill the interstices between the rods in the respective layers. The plate 17 as a whole spaces the two layers apart and completely fills all of the intervening space, including the interstices. The low heat conductive filling for the spaces between the outer sides of the layers and the supports 15 and 16 is shown as sheets or plates 18 which are each smooth on one side to conform to the smooth surfaces of the supports 15 and 16. The other side of each plate 18 is of like conformation to the surfaces of the plate 17, so as to conform to the contour of the cylindrical rods and fill the interstices between them at the outsides of the layers formed thereby.

The plates or sheets 17 and 18 may be composed of any suitable material. Wool felt impregnated with an adhesive, such as shellac varnish, and pressed or molded to shape and dried, produces good results, and that is the material used in the construction illustrated in the drawings. At the bottom of the wall, to secure the proper offset relation of the layers, a filling and supporting strip 19 of semicircular cross section is inserted beneath one of the layers. This strip as shown is composed of the same material as the sheets 17 and 18 but it could be of different material and may be omitted if desired.

The alternate arrangement of layers of vacuum inclosing cylinders 11 and low heat conductive filling sheets 17 and 18 produces more effective heat insulation than either the one or the other would if employed alone and without the other. The filling plates securely support the vacuum units 11; and as there are no openings or air spaces in the wall there can be no convection air currents.

To prevent heat radiation across the vacua the shells 13 of the vacuum inclosing cylinders are provided on the inside with a reflecting surface, such as a silvered surface, but such reflecting surface could be provided on the outside or on both sides of the shells 13 if desired.

The cushioning sleeve 14 may be composed of thin paper, such as tissue paper, and may be secured to the shell 13 by an adhesive such as sizing. In the drawings the thickness of the cushioning sleeve 14 is exaggerated for the sake of clearness. The shell 13 is composed of pressure-resisting low heat conductive material, and as this shell is sealed by fusing it is formed of vitreous material, such as glass, as indicated in the drawings.

The shell 13 is provided at one end with a projecting sealing tip 20, the sealing tip being allowed to project for the sake of convenience in manufacture. The sealing tip 20 is protected from injury by a metal cap 21 which fits loosely over it and is retained in place by a cement filling 22 within the cap and surrounding the sealing tip, the tip and the cap each being provided with an unevenness, shown as an annular bead on the sealing tip and as a corresponding annular groove internally of the cap, the cement filling engaging the bead and the groove to hold the cap in place. The other end of the shell 13 is provided with a depressed or indented portion 23 forming an external cavity or recess adapted to receive the sealing tip 20 and its protective coverings 21 and 22 of the longitudinally next adjacent vacuum inclosing cylinder when such cylinders are assembled in a heat insulating wall structure as shown in the drawings, thus permitting the longitudinally alined units or cylinders to come close together throughout their end portions, including the circumferential portions of the ends. The cushioning pads 12 may be of soft wool felt and are of considerable thickness to effectively cushion the ends of the vacuum inclosing cylinders one from another and so as to fill all spaces around the sealing tip when the pad or disk is compressed between the ends of two of the vacuum inclosing cylinders 11.

In actual practice the vacuum inclosing bodies 11 are comparatively small in size, being substantially of the size shown in Figs. 3 and 4 of the drawings. Because of the small size of the bodies or units 11 and the cushioning material by which they are surrounded, together with the flexible nature of the filling sheets, the heat insulating wall as a whole is sufficiently flexible to accommodate itself without injury to all bending and twisting or other strains to which it may be subjected in use.

It is obvious that various modifications may be made in the construction shown and above particularly described within the principle and scope of my invention.

I claim:—

1. A heat insulating wall comprising vacuum inclosing tubes adjacently assembled to form a plurality of adjacent layers spaced apart and having uneven surfaces, supports outside of the outer layers and spaced therefrom, spacing plates interposed between the layers and having uneven surfaces permanently conformed in shape to the uneven surfaces of the layers, and other plates interposed between the outer layers and the supports and having their outside surfaces permanently conformed to the supports and having inside uneven surfaces permanently conformed in shape to the uneven surfaces of the adjacent layers.

2. A heat insulating wall comprising cylindrical vacuum inclosing bodies assembled in substantial parallelism with the plane of the wall and one abutting another longitudinally to form continuous cylindrical rods, such rods being arranged one in contact with another to form a plurality of layers spaced apart and each substantially parallel with the plane of the wall and the rods in one layer breaking joints with the rods in an adjacent layer, supports outside of the outer layers and spaced therefrom, and sheets of low heat conductive material interposed between adjacent layers and having surfaces permanently shaped to the contour of the rods in the layers and filling the interstices between the rods, and other sheets of low heat conductive material interposed between the outer layers and the supports and having their outside surfaces conformed to the supports and their inside surfaces permanently shaped to the contour of the rods in the layers and filling the interstices.

3. A heat insulating wall comprising cylindrical vacuum inclosing bodies assembled in substantial parallelism with the plane of the wall and abutting each other longitudinally to form continuous cylindrical rods, such rods being arranged in contact with one another to form a plurality of layers spaced apart and each substantially parallel with the plane of the wall and the rods in one layer breaking joints with the rods in an adjacent layer, supports outside of the outer layers and spaced therefrom, and dry sheets composed of wool felt and an adhesive interposed between adjacent layers and having surfaces permanently shaped to the contour of the rods in the layers and filling the interstices between the layers, and other dry sheets of substantially the same material interposed between the outer layers and the supports and having their outside surfaces conformed to the supports and their inside surfaces permanently shaped to the contour of the rods in the layers and filling the interstices.

4. A heat insulating wall comprising cylindrical vacuum inclosing bodies assembled in substantial parallelism with the plane of the wall and one abutting another longitudinally to form continuous cylindrical rods, each of the vacuum inclosing bodies being provided with a cushioning sleeve adherently secured thereto, such rods being arranged in contact with one another to form a plurality of layers spaced apart and each substantially parallel with the plane of the wall and the rods in one layer breaking joints with the rods in an adjacent layer, supports outside of the outer layers and spaced therefrom, and low heat conductive filling material interposed between the layers and between the outside layers and the supports.

5. A heat insulating wall comprising cylindrical vacuum inclosing bodies assembled in substantial parallelism with the plane of the wall and one abutting another longitudinally to form continuous cylindrical rods, each of the vacuum inclosing bodies being provided at one end with a projecting sealing tip and provided at the other end with a depression adapted to receive the sealing tip of the next adjacent vacuum inclosing body in the length of the rod, such rods being arranged in contact with one another to form a plurality of layers spaced apart and each substantially parallel with the plane of the wall and the rods in one layer breaking joints with the rods in an adjacent layer, supports outside of the outer layers and spaced therefrom, and low heat conductive filling material interposed between the layers and between the outside layers and the supports.

6. A heat insulating wall comprising cylindrical vacuum inclosing bodies assembled in substantial parallelism with the plane of the wall and abutting one another longitudinally to form continuous cylindrical rods, each of the vacuum inclosing bodies being provided at one end with a projecting sealing tip and provided at the other end with a depression adapted to receive the sealing tip of the next adjacent vacuum inclosing body in the length of the rod, a cushioning pad interposed between adjacent abutting ends of the vacuum inclosing bodies, such rods being arranged in contact with one another to form a plurality of layers spaced apart and each substantially parallel with the plane of the wall and the rods in one layer breaking joints with the rods in an adjacent layer, supports outside of the outer layers and spaced therefrom, and low heat conductive filling material interposed between the layers and between the outside layers and the supports.

7. A heat insulating wall comprising cylindrical vacuum inclosing bodies one abutting another longitudinally to form cylindrical rods, such rods being arranged one in contact with another to form a plurality of layers spaced apart, the rods in one layer breaking joints with the rods in an adjacent layer, supports outside of the outer layers and spaced therefrom, and sheets of low heat conductive material interposed between adjacent layers and having surfaces permanently shaped to the contour of the rods in the layers and filling the interstices between the rods, and other sheets of low heat conductive material interposed between the outer layers and the supports and having their outside surfaces conformed to the supports and their inside surfaces permanently shaped to the contour of the rods in the layers and filling the interstices.

8. A heat insulating wall comprising vacuum inclosing cylinders arranged adjacent one with another to form a plurality of layers spaced apart, the cylinders in one layer breaking joints with the cylinders in an adjacent layer, supports outside of the outer layers and spaced therefrom, and sheets of low heat conductive material interposed between adjacent layers and having surfaces permanently shaped to the contour of the cylinders in the layers and filling the interstices between the cylinders, and other sheets of low heat conductive material interposed between the outer layers and the supports and having their outside surfaces conformed to the supports and their inside surfaces permanently shaped to the contour of the cylinders in the layers and filling the interstices.

9. A unit for heat insulating construction comprising a vacuum inclosing cylinder provided at one end with a depression and provided at the other end with a projecting sealing tip, a metal protecting cap for the sealing tip fitting loosely over the sealing tip, and a filling of cement inside of the cap and surrounding and embedding the sealing tip.

10. A unit for heat insulating construction comprising a vacuum inclosing cylinder provided at one end with a depression and provided at the other end with a projecting sealing tip, a metal protecting cap for the sealing tip fitting loosely over the sealing tip, and a cap-retaining filling of cement interposed between the inside of the cap and the sealing tip, the cap and the sealing tip each being provided with an unevenness adapted to be engaged by the cement to hold the cap in place.

In testimony whereof I affix my signature in presence of two witnesses.

CLYDE J. COLEMAN.

Witnesses:
  WM. ASHLEY KELLY,
  BERNARD COWEN.